(12) United States Patent
Oughton, Jr. et al.

(10) Patent No.: US 7,800,924 B2
(45) Date of Patent: Sep. 21, 2010

(54) POWER CONVERTER APPARATUS AND METHODS USING NEUTRAL COUPLING CIRCUITS WITH INTERLEAVED OPERATION

(75) Inventors: George W. Oughton, Jr., Raleigh, NC (US); Hans-Erik Pfitzer, Wake Forest, NC (US)

(73) Assignee: Eaton Corporation, Cleveland, OH (US)

( * ) Notice: Subject to any disclaimer, the term of this patent is extended or adjusted under 35 U.S.C. 154(b) by 559 days.

(21) Appl. No.: 11/691,718

(22) Filed: Mar. 27, 2007

(65) Prior Publication Data

US 2008/0239775 A1  Oct. 2, 2008

(51) Int. Cl.
*H02M 5/42* (2006.01)
*H02M 5/44* (2006.01)

(52) U.S. Cl. .................. 363/34; 363/37; 363/142

(58) Field of Classification Search ............ 363/34, 363/37, 41, 56.02, 132, 142; 323/272
See application file for complete search history.

(56) References Cited

U.S. PATENT DOCUMENTS

| 3,207,974 | A | 9/1965 | McMurray |
| 3,694,718 | A | 9/1972 | Graf et al. |
| 3,800,211 | A | 3/1974 | Tracy |
| 5,070,440 | A | 12/1991 | Walker |
| 5,408,404 | A * | 4/1995 | Mitchell ................ 363/71 |
| 5,852,558 | A * | 12/1998 | Julian et al. ............ 363/132 |
| 6,314,007 | B2 * | 11/2001 | Johnson et al. .......... 363/37 |
| 7,046,527 | B2 * | 5/2006 | West ..................... 363/41 |
| 7,088,601 | B2 | 8/2006 | Tracy et al. |
| 2005/0162137 | A1 * | 7/2005 | Tracy et al. ............ 323/217 |

\* cited by examiner

*Primary Examiner*—Jeffrey L Sterrett
*Assistant Examiner*—Fred E Finch, III
(74) *Attorney, Agent, or Firm*—Myers Bigel Sibley & Sajovec, P.A.

(57) ABSTRACT

A power converter apparatus, such as an uninterruptible power supply (UPS), includes an inverter having an input coupled to a first DC bus and a second DC bus and configured to generate an AC output with respect to a neutral terminal at a phase output terminal thereof. The apparatus further includes first and second neutral coupling circuits, each configured to selectively couple the first DC bus and the second DC bus to the neutral terminal, and a control circuit configured to cause interleaved operation of the neutral coupling circuits.

21 Claims, 4 Drawing Sheets

US 7,800,924 B2

POWER CONVERTER APPARATUS AND METHODS USING NEUTRAL COUPLING CIRCUITS WITH INTERLEAVED OPERATION

BACKGROUND OF THE INVENTION

The invention relates to power conversion apparatus and methods and, more particularly, to inverter apparatus and methods of operation thereof.

Inverters are used in a variety of different power systems applications, including uninterruptible power supplies (UPSs), power conditioners and generator/utility grid interfaces. In a typical on-line UPS, for example, a rectifier may be used to provide power to a DC bus from an AC source, such as a utility source, and a battery may be coupled to the DC bus to provide auxiliary power to the DC bus when the AC source fails. An output inverter coupled to the DC bus may be used to generate AC powers. Other types of UPSs may not utilize an input rectifier, but may include similar output inverter coupled to a DC bus that is powered by a backup battery along similar lines.

A variety of techniques have been developed to improve the performance of inverter apparatus. For example, U.S. Pat. No. 7,088,601 to Tracy et al. describes a power converter apparatus, such as an on-line or line-interactive UPS, that includes a DC/AC converter that is coupled to first and second DC busses. A voltage range between the DC busses is shifted with respect to an output neutral using, for example, a halfbridge circuit that is configured to selectively couple the DC busses to the neutral. Such a neutral coupling technique may be used to reduce switching losses and component stress. U.S. Pat. No. 7,046,527 to West describes an inverter for use in connecting distributed energy systems (e.g., photovoltaic arrays, fuel cells, wind turbines and the like) to a utility grid, the inverter including multiple, high frequency switching elements that are operated in a synchronous, time-skewed arrangement to provide potential reduction in ripple current.

SUMMARY OF THE INVENTION

In some embodiments of the present invention, a power converter apparatus includes an inverter having an input coupled to a first DC bus and a second DC bus and configured to generate an AC output with respect to a neutral terminal at a phase output terminal thereof. The apparatus further includes first and second neutral coupling circuits, each configured to selectively couple the first DC bus and the second DC bus to the neutral terminal, and a control circuit configured to cause interleaved operation of the neutral coupling circuits.

According to further embodiments, the control circuit includes a pulse width modulation circuit configured to generate a pulse train signal including a series of pulses having widths that vary responsive to a control variable and a drive circuit configured to drive respective ones of the neutral coupling circuits responsive to respective interleaved sets of pulses of the pulse train signal. The pulse train signal may be a first pulse train signal and the drive circuit may include a pulse separation circuit configured to generate second and third pulse train signals including respective trains of pulses corresponding to respective ones of the interleaved sets of pulse, and respective first and second drive circuits that drive respective ones of the neutral coupling circuits responsive to respective ones of the second and third pulse train signals. A frequency of the first pulse train signal may be two or more times greater than a frequency of the second and third pulse train signals. The pulses of the second and third pulse train signals may have pulse widths that are integer multiples of the pulse widths of the corresponding pulses of the first pulse train signal.

In additional embodiments of the present invention, a UPS includes a phase output terminal, a neutral terminal, a first DC bus and a second DC bus. A common mode inductor has a first terminal coupled to one of the first DC bus and the second DC bus and a second terminal configured to be coupled to a battery. A filter capacitor is coupled between the second terminal of the common mode inductor and the neutral terminal. An inverter is coupled to the first DC bus and second DC bus and configured to generate an AC output with respect to the neutral terminal at the phase output terminal. First and second neutral coupling circuits are coupled in parallel between the first DC bus and the second DC bus and are each configured to selectively couple the first DC bus and the second DC bus to the neutral terminal. A control circuit provides interleaved operation of the neutral coupling circuits. The control circuit may be configured to control the neutral coupling circuits to cause a voltage range between the first DC bus and the second DC bus to shift with respect to the neutral terminal. The inverter may include first and second parallel-connected phase coupling circuits configured to selectively couple the first DC bus and the second DC bus to the phase output terminal in an interleaved manner.

Some embodiments of the present invention provide methods of operating a power conversion apparatus including an inverter coupled to first and second DC busses and configured to generate an AC output with respect to a neutral terminal at a phase output terminal. First and second neutral coupling circuits are provided, each configured to selectively couple the first DC bus and the second DC bus to a neutral terminal. Operations of the first and second neutral coupling circuits are interleaved while operating the inverter to generate the AC voltage with respect to the neutral terminal.

DETAILED DESCRIPTION OF EXEMPLARY EMBODIMENTS

Figure 1:
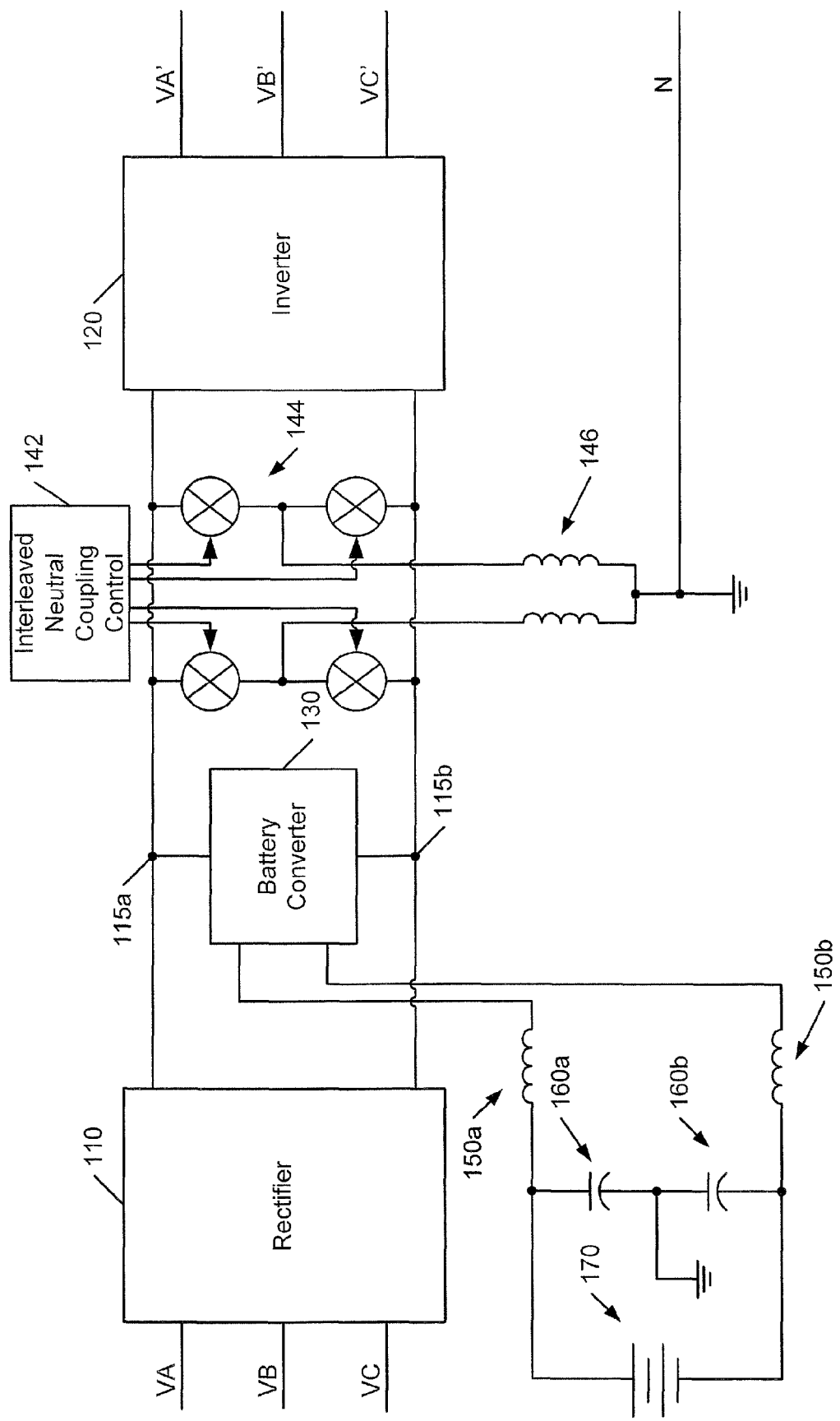
FIG. 1 is a schematic diagram illustrating a UPS according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the invention may be embodied as system and methods. Embodiments of the invention may include hardware and/or software. Embodiments of the invention include circuitry configured to provide functions described herein. It will be appreciated that such circuitry may include analog circuits, digital circuits, and combinations of analog and digital circuits.

FIG. 1 illustrates a power supply apparatus according to some embodiments of the present invention. More particularly, FIG. 1 illustrates an on-line UPS that includes first and second DC busses 115a, 115b, here shown as coupled to an output of a rectifier 110 that is configured to receive power from an AC power source at phase input terminals VA, VB, VC. The UPS further includes an inverter 120 coupled to the DC busses 115a, 115b and configured to generate an AC output with respect to a neutral terminal N at phase output terminals VA', VB', VC'. A battery converter circuit 130 is coupled to the DC busses 115a, 115b and is configured to transfer power to and from the DC busses 115a, 115b from a battery 170.

As further illustrated, the UPS includes neutral coupling circuits 144 that are coupled between the DC busses 115a, 115b and configured to selectively couple the DC busses 115a, 115b to the neutral terminal N via respective inductors 146. The neutral coupling circuits 144 may be used to control a relationship between the DC busses 115a, 115b and the neutral terminal N. For example, duty cycles of the neutral coupling circuits 144 may be varied to shift the DC busses 115a, 115b with respect to the neutral terminal N such that asymmetry may be created between the voltages of the respective DC busses 115a, 115b with respect to the neutral terminal N. Such a technique may be used to achieve increased power conversion efficiency and reduced component stress for the inverter 120 as described, for example, in the aforementioned U.S. Pat. No. 7,088,601 to Tracy et al., which is hereby incorporated herein by reference in its entirety.

In the illustrated embodiments, the battery 170 is coupled to the DC busses 115a, 115b by respective common mode inductors 150a, 150b, while respective filter capacitors 160a, 160b AC couple the terminals of the battery 170 to a ground node. According to some embodiments of the present invention, the common mode inductors 150a, 150b may be used to limit relatively high frequency currents that may be induced between the DC busses 115a, 115b and the battery 170 arising from switching operations of the neutral coupling circuits 144. This, in conjunction with the filter capacitors 160a, 160b may reduce voltage excursions at the terminals of the battery 170.

According to further aspects of the invention, performance may be further improved by providing an interleaved neutral coupling control circuit 142 configured to operate the neutral coupling circuits 144 in an interleaved manner, e.g., the control circuit 142 may cause complementary switching device pairs of the neutral coupling circuits 144 to switch in an alternating pattern. Such interleaved switching may reduce currents passing through the common mode inductors 160a, 160b and, thus, may allow the use of smaller inductors. In addition, reduction of these currents can further reduce voltage excursions at the terminals of the battery 170, which may enable use of relatively smaller filter capacitors 160a, 160b. Such a technique may, for example, allow use of a ground-reference battery monitoring circuit for the battery 170. Such an arrangement may also support the use of a common battery connection for multiple UPSs. For example, the battery 170 may be connected in a similar fashion to multiple UPSs having the transformerless topology shown in FIG. 1 without unsynchronized operation of the multiple UPSs causing the generation of unduly large circulating currents arising from out-of-sync voltage excursions arising from operations of the switching devices in the UPSs. This can be particularly advantageous in large-scale or modular UPS applications.

Figure 2:
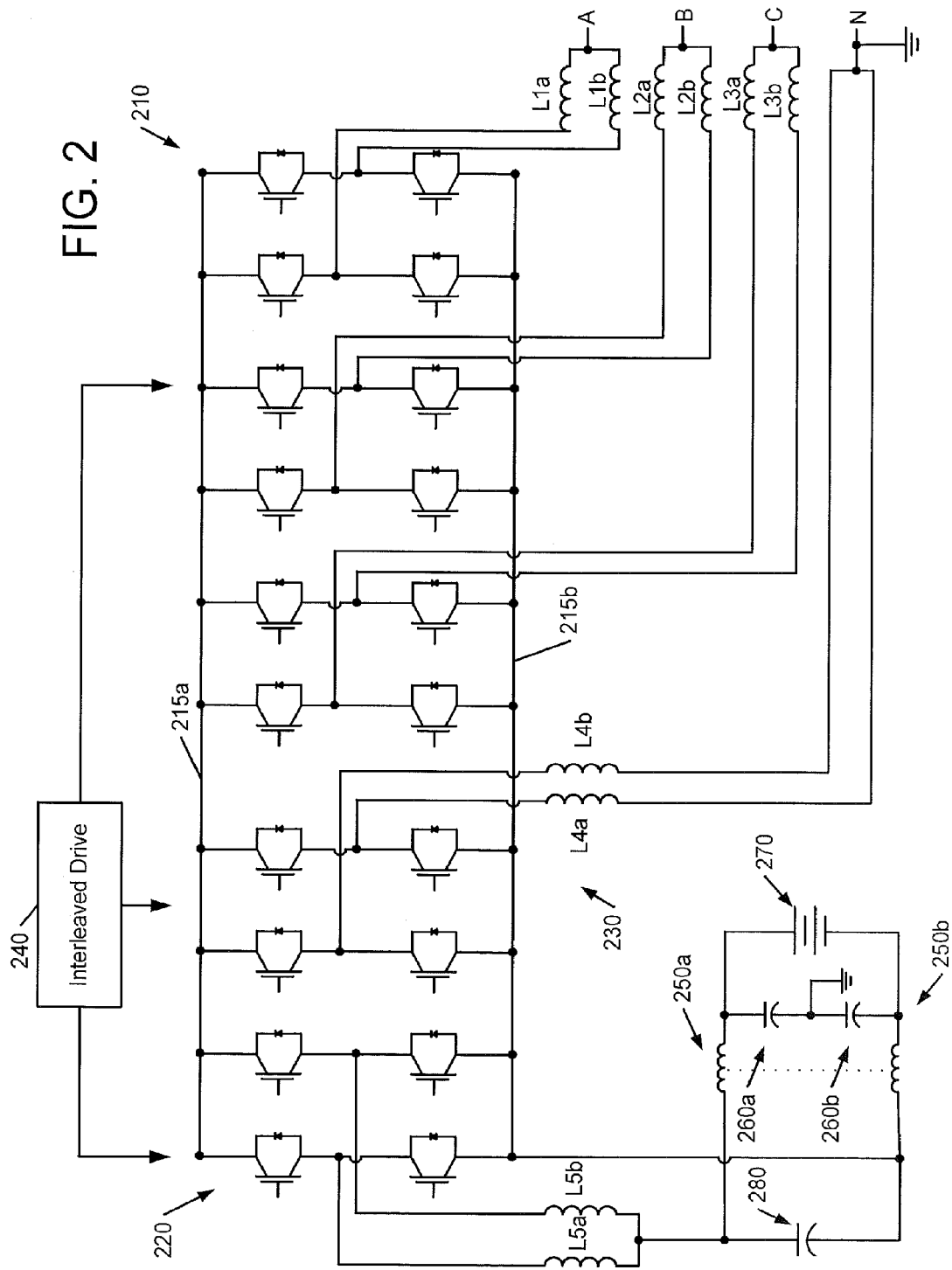
FIG. 2 is a schematic diagram illustrating a UPS according to further embodiments of the present invention.

FIG. 2 illustrates an exemplary implementation of an inverter 210, neutral coupling circuitry 230 and a battery converter circuit 220 according to further embodiments of the present invention. The inverter includes a plurality of half-bridge circuits coupled between first and second DC busses 215a, 215b. Each half-bridge includes a complementary pair of insulated gate bipolar transistors (IGBTs) with associated diodes. The half-bridges are arranged in parallel pairs, i.e., respective pairs of half-bridges are coupled to respective phase output terminals A, B, C, with respective ones of the half-bridges being coupled to the phase output terminals by respective inductors L1a, L1b, L2a, L2b, L3a, L3b.

The neutral coupling circuitry 230 and the battery converter circuit 220 are similarly arranged. The neutral coupling circuitry 230 includes parallel-connected half-bridges that are coupled to a grounded neutral output terminal N via respective inductors L4a, L4b. The battery converter circuit 220 includes parallel-connected half-bridge circuits coupled to respective inductors L5a, L5b. The inductors L5a, L5b are coupled in common to a first common mode inductor 250a, which is also coupled to a positive terminal of a battery 270. A negative terminal of the battery 270 is coupled to the negative DC bus 215b by a second common mode inductor 250b, which may be magnetically coupled to the first common mode inductor 250a (e.g., by using separate windings on a common magnetic core). Respective filter capacitors 260a, 260b are connected between ground and respective ones of the positive and negative terminals of the battery 270. Another filter capacitor 280 is coupled between the common mode inductors 250a, 250b. As further illustrated, each of the paralleled half-bridge pairs in the inverter 210, neutral coupling circuit 230 and battery converter 220 may be operated in an interleaved manner by an interleaved drive circuit 240.

Figure 3:
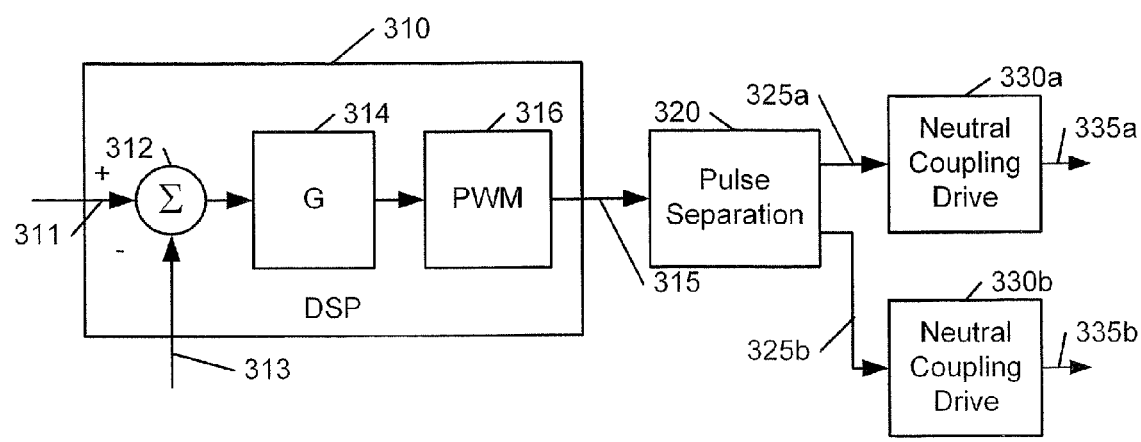
FIG. 3 is a schematic diagram illustrating a neutral coupling control circuit according to some embodiments of the present invention.

FIG. 3 illustrates an implementation of a neutral coupling control circuit according to some embodiments of the present invention. A processor, in particular, a digital signal processor (DSP) 310, is configured to implement components of a neutral coupling control loop, including a summing junction 312, compensation block 314 and pulse width modulator (PWM) 316. The summing junction 312 serves to compare a reference signal 313 (e.g., a desired set point) to a feedback signal 313 representative of a variable (e.g., current, voltage or other quantity) controlled by the control loop, generating an error signal that is provided to the compensation block 314. An output produced by the compensation block 314 varies pulse widths of pulses of a pulse train signal 315 produced by the PWM 316.

The pulse train signal 315 is provided to a pulse separation circuit 320, which may be implemented using, for example, a logic circuit, such as a programmable logic device (PLD). The pulse separation circuit 320 responsively produces first and second pulse train signals 325a, 325b that are provided to respective neutral coupling circuit drive circuits 330a, 330a, that generate interleaved gate drive signals 335a, 335b for respective neutral coupling bridge circuits.

Figure 4:
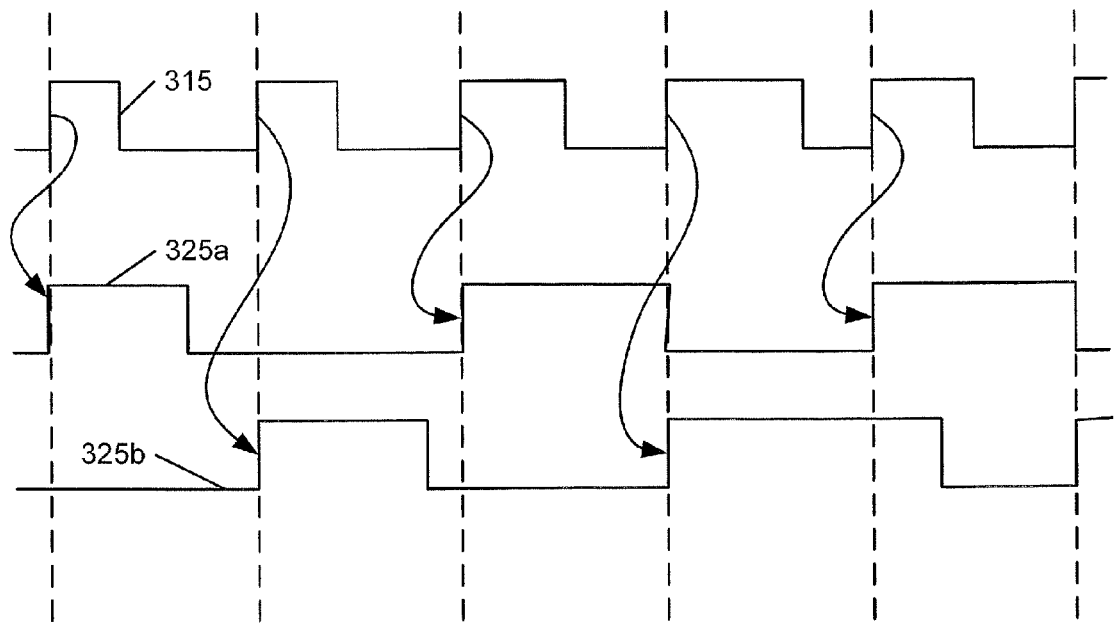
FIG. 4 is a timing diagram illustrating exemplary operations of the control circuit of FIG. 3 according to further embodiments of the present invention.

For example, referring to FIG. 4, the PWM 316 may produce a PWM output signal as shown in the upper trace of FIG. 4. The first and second pulse train signals 325a, 325b produced by the pulse separation circuit 320 includes pulses corresponding to alternate pulses of the PWM output signal 315. As further shown, the pulse separation circuit also doubles the pulse widths of the first and second pulse train signals with respect to the corresponding pulses in the PWM output signal 315. This can enable the duty cycle of the switching devices driven responsive to the first and second pulse train signals 325a, 325b to vary from 0-100% when the duty cycle of the PWM output signal 315 varies from 0-100%. The use of parallel-connected half-bridges driven in such an interleaved manner may be viewed as effectively halving the switching rate of the individual devices while maintaining a control bandwidth corresponding to the higher pulse rate of the PWM output signal 315.

It will be appreciated that, although FIGS. 1-4 illustrate using two interleaved neutral coupling circuits, other embodiments of the invention may use more than two interleaved neutral coupling circuits to similar effect. In addition, while a closed loop control implementation is shown in FIG. 3, a variety of other open- or closed-loop implementations may be used for neutral coupling control in various embodiments of the present invention.

Figure 5:
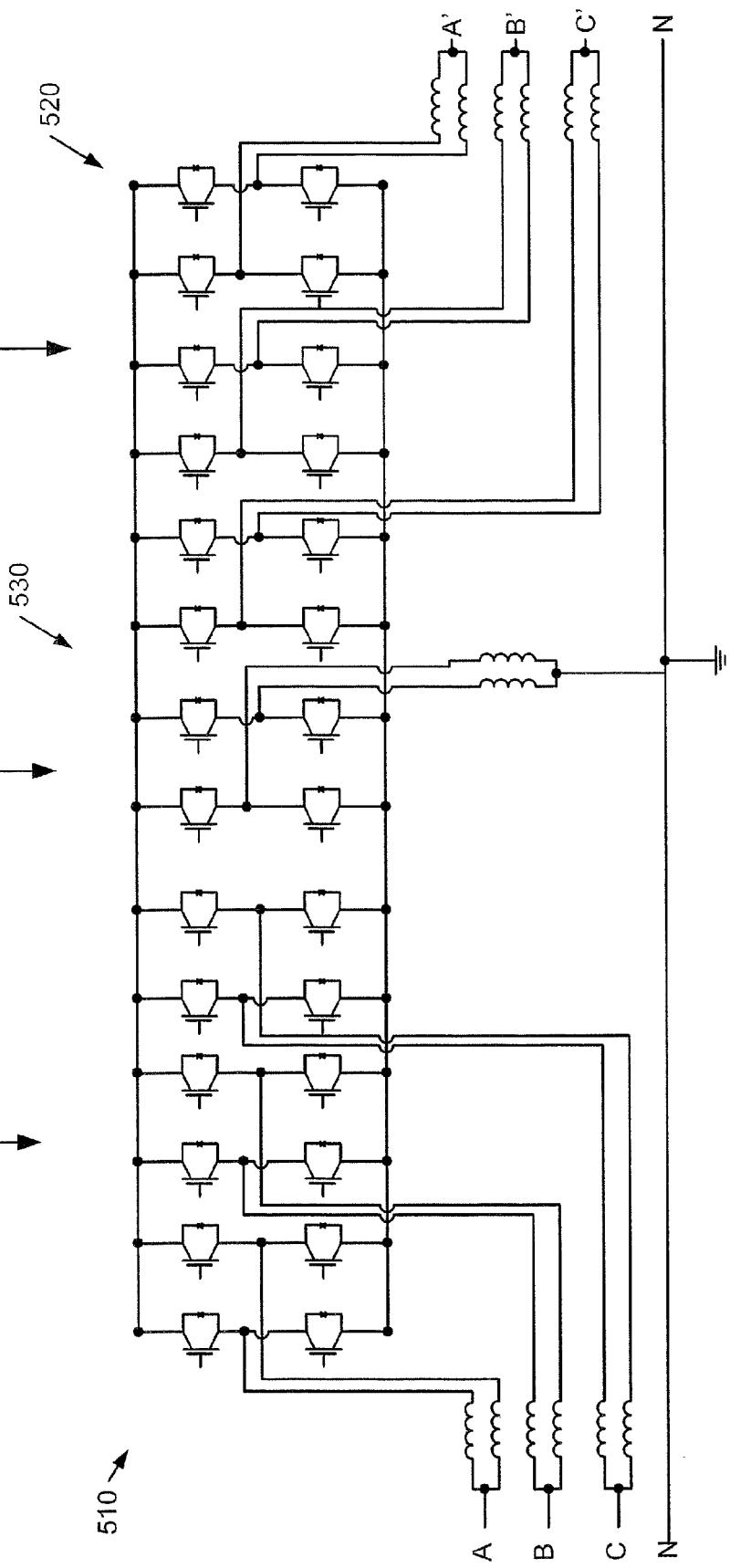
FIG. 5 is a schematic diagram illustrating portions of a UPS according to still further embodiments of the present invention.

According to further embodiments of the present invention, interleaved parallel coupling circuits may be used for additional converter circuits in a UPS. For example, FIG. 5 illustrates a UPS power train configuration in which an input rectifier 510 coupled to phase output terminals A, B, C, an output inverter 520 coupled to phase output terminals A', B', C' and neutral coupling circuit 530 coupled to neutral terminals N each use parallel-connected pairs of half-bridge circuits that are each driven in an interleaved manner by a interleaved drive circuit 540. Such a configuration may be used in a UPS configuration as shown in FIG. 1 to further enhance the benefits in UPS/battery interaction described above.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A power converter apparatus comprising:
   a rectifier having an input coupled to an AC source and an output coupled to a first DC bus and a second DC bus and configured to generate a DC voltage across the first and second DC busses;
   an inverter having an input coupled to the first DC bus and the second DC bus and configured to generate an AC output with respect to a neutral terminal at a phase output terminal;
   parallel first and second neutral coupling circuits, each configured to selectively couple the first DC bus and the second DC bus to the neutral terminal; and
   a control circuit configured to cause interleaved operation of the neutral coupling circuits while the rectifier is generating the DC voltage across the first and second DC busses.

2. The apparatus of claim 1, wherein the control circuit is configured to operate the neutral coupling circuits to shift a voltage range between the first DC bus and the second DC bus with respect to the neutral terminal.

3. The apparatus of claim 1, wherein the control circuit comprises:
   a pulse width modulation circuit configured to generate a pulse train signal; and
   a drive circuit configured to drive respective ones of the neutral coupling circuits responsive to respective interleaved sets of pulses of the pulse train signal.

4. The apparatus of claim 3, wherein the pulse train signal comprises a first pulse train signal and wherein the drive circuit comprises:
   a pulse separation circuit configured to generate second and third pulse train signals comprising respective trains of pulses corresponding to respective ones of the interleaved sets of pulses; and
   respective first and second drive circuits that drive respective ones of the neutral coupling circuits responsive to respective ones of the second and third pulse train signals.

5. The apparatus of claim 4, wherein the pulses of the second and third pulse train signals have pulse widths that are integer multiples of pulse widths of the corresponding pulses of the first pulse train signal.

6. The apparatus of claim 1, wherein the inverter comprises first and second parallel-connected phase coupling circuits configured to selectively couple the first DC bus and the second DC bus to the phase output terminal in an interleaved manner.

7. The apparatus of claim 1, wherein respective ones of the first and second neutral coupling circuits are configured to selectively couple the first DC bus and the second DC bus to the neutral terminal via respective first and second inductors that are not magnetically coupled.

8. An uninterruptible power supply (UPS), comprising:
   a phase output terminal;
   a neutral terminal;
   a first DC bus and a second DC bus;
   a rectifier having an input coupled to an AC source and an output coupled to the first DC bus and the second DC bus and configured to generate a DC voltage across the first and second DC busses;
   a common mode inductor having a first terminal coupled to one of the first DC bus and the second DC bus and a second terminal configured to be coupled to a battery;
   a filter capacitor coupled between the second terminal of the common mode inductor and the neutral terminal;
   an inverter coupled to the first DC bus and second DC bus and configured to generate an AC output with respect to the neutral terminal at the phase output terminal;
   parallel first and second neutral coupling circuits coupled in parallel between the first DC bus and the second DC bus and each configured to selectively couple the first DC bus and the second DC bus to the neutral terminal; and a control circuit configured to cause interleaved operation of the neutral coupling circuits while the rectifier is generating the DC voltage across the first and second DC busses.

9. The UPS of claim 8, wherein the control circuit is configured to cause the neutral coupling circuits to shift a voltage range between the first DC bus and the second DC bus with respect to the neutral terminal.

10. The UPS of claim 8, wherein the control circuit comprises:

a pulse width modulation circuit configured to generate a pulse train signal; and a drive circuit configured to drive respective ones of the neutral coupling circuits responsive to respective interleaved sets of pulses of the pulse train signal.

11. The UPS of claim 10, wherein the pulse train signal comprises a first pulse train signal and wherein the drive circuit comprises:

a pulse separation circuit configured to generate second and third pulse train signals comprising respective first and second trains of pulses corresponding to respective ones of the interleaved sets of pulse; and respective first and second drive circuits that drive respective ones of the neutral coupling circuits responsive to respective ones of the second and third pulse train signals.

12. The UPS of claim 11, wherein the pulses of the second and third pulse train signals have pulse widths that are integer multiples of the pulse widths of the corresponding pulses of the first pulse train signal.

13. The UPS of claim 8:

wherein the common mode inductor comprises:

a first common mode inductor configured to be coupled between the first DC bus and a first terminal of the battery; and a second common mode inductor configured to be coupled between the second DC bus and a second terminal of the battery; and wherein the filter capacitor comprises:

a first filter capacitor coupled between the first common mode inductor and the neutral; and a second filter capacitor coupled between the second common mode inductor and the neutral.

14. The UPS of claim 8, wherein the inverter comprises first and second parallel-connected phase coupling circuits configured to selectively couple the first DC bus and the second DC bus to the phase output terminal in an interleaved manner.

15. The UPS of claim 8, wherein respective ones of the first and second neutral coupling circuits are configured to selectively couple the first DC bus and the second DC bus to the neutral terminal via respective first and second inductors that are not magnetically coupled.

16. A method of operating a power conversion apparatus comprising a rectifier having an input coupled to an AC source and an output coupled to a first DC bus and a second DC bus and configured to generate a DC voltage across the first and second DC busses and an inverter coupled to the first and second DC busses and configured to generate an AC output with respect to a neutral terminal at a phase output terminal, the method comprising:

providing parallel first and second neutral coupling circuits, each configured to selectively couple the first DC bus and the second DC bus to a neutral terminal; and interleaving operations of the first and second neutral coupling circuits while operating the rectifier to generate the DC voltage across the first and second DC busses and operating the inverter to generate the AC voltage with respect to the neutral terminal.

17. The method of claim 16, further comprising operating the neutral coupling circuits to cause a voltage range between the first DC bus and the second DC bus to shift with respect to the neutral terminal.

18. The method of claim 16, wherein interleaving operations of the first and second neutral coupling circuits while operating the rectifier to generate the DC voltage across the first and second DC busses and operating the inverter to generate the AC voltage with respect to the neutral terminal comprises:

generating a pulse train signal comprising a series of pulses having widths that vary responsive to a control variable; and driving respective ones of the neutral coupling circuits responsive to respective interleaved sets of pulses of the pulse train signal.

19. The method of claim 18, wherein driving respective ones of the neutral coupling circuits responsive to respective interleaved sets of pulses of the pulse train signal comprises:

generating second and third pulse train signals comprising respective trains of pulses corresponding to respective ones of the interleaved sets of pulse; and driving respective ones of the neutral coupling circuits responsive to respective ones of the second and third pulse train signals.

20. The method of claim 19, wherein the pulses of the second and third pulse train signals have pulse widths that are a integer multiple of the pulse widths of the corresponding pulses of the first pulse train signal.

21. The method of claim 16, wherein respective ones of the first and second neutral coupling circuits are configured to selectively couple the first DC bus and the second DC bus to the neutral terminal via respective first and second inductors that are not magnetically coupled.

* * * * *